Feb. 4, 1969 D. J. SQUIERS 3,426,178
CONTROL APPARATUS
Filed Oct. 31, 1966
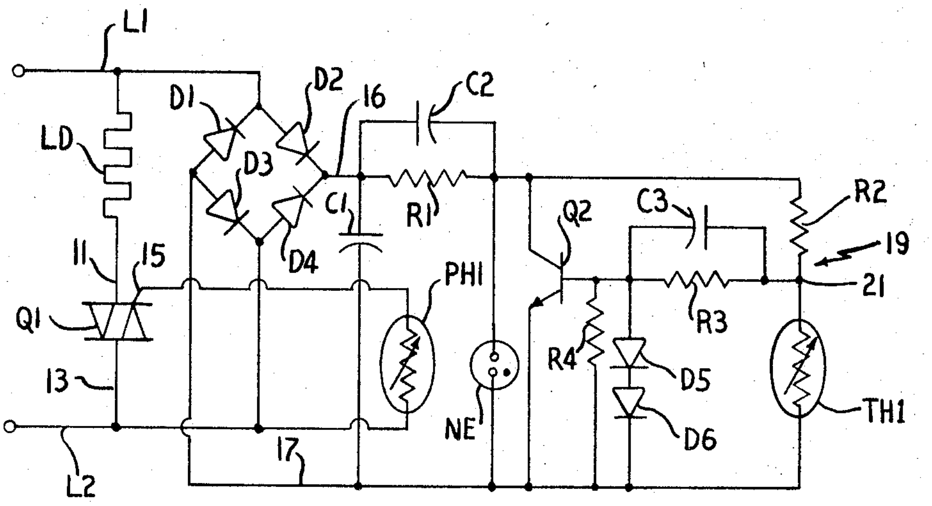
David J. Squiers,
Inventor.
Koenig, Senniger, Powers and Leavitt,
Attorneys.

United States Patent Office 3,426,178
Patented Feb. 4, 1969

3,426,178
CONTROL APPARATUS

David J. Squiers, North Attleboro, Mass., assignor to Texas Instruments Incorporated, Dallas, Tex., a corporation of Delaware Filed Oct. 31, 1966, Ser. No. 590,922
U.S. Cl. 219—502 18 Claims
Int. Cl. H05b *1/02*

This invention relates to control apparatus and more particularly to apparatus for controlling the energization of an electrical load in response to variations in the resistance of a sensor.

Among the several objects of the invention may be noted the provision of apparatus for controlling the energization of an electrical load in response to variations in the resistance of a sensor, which apparatus does not require the use of a relay or other mechanical device having moving parts; the provision of such control apparatus which is readily operable directly on commercial line voltages without the necessity of employing expensive voltage reducing transformers; the provision of such apparatus which is operable on A.C. of different voltages and frequencies without substantial modification; the provision of such control apparatus which employs solid-state components; the provision of such control apparatus in which the solid-state components are inherently protected from over-voltage damage; the provision of such control apparatus which applies only relatively small voltages to the ambient temperature; the provision of such control apparatus which applies only relatively small voltages to the sensor thereby permitting the use of sensors which are field-sensitive or which may self-heat under higher voltages; the provision of such control apparatus which is highly reliable; and the provision of such control apparatus which is relatively inexpensive. Other objects and features will be in part apparent and in part pointed out hereinafter.

The invention accordingly comprises the constructions hereinafter described, the scope of the invention being indicated in the following claims.

The accompanying drawing, in which one of various possible embodiments of the invention is illustrated, is a schematic circuit diagram of control apparatus of this invention.

Referring now to the drawing, A.C. power is applied to the apparatus at commercial line voltage, e.g., 115 volts A.C., through a pair of supply leads L1 and L2. A load LD whose energization is to be controlled is connected across leads L1 and L2 by a circuit including a triac Q1. Triac Q1 is a controllable, semiconductor current switching device having two power or output terminals as indicated at 11 and 13 and a control or gate electrode as indicated at 15. Triac Q1 may conveniently be considered as a pair of SCR's (silicon control rectifiers) connected back-to-back. When a triggering current greater than a predetermined level is applied to control electrode 15, triac Q1 conducts current between terminals 11 and 13 and applies full-wave power to load LD. A photocell PH1, which may for example be constituted by a cadmium sulfide light-dependent resistor, is connected between supply lead L2 and control electrode 15 for triggering the triac Q1 when the photocell is exposed to light.

The input circuit of a full-wave rectifier bridge, constituted by diodes D1–D4, is connected across supply leads L1 and L2 and the output circuit of this rectifier bridge is connected to a filter capacitor C1 for providing a source of D.C. through a pair of leads 16 and 17 to the control circuitry described hereinafter.

A neon glow tube NE is connected across leads 16 and 17 through a circuit including a current-limiting resistor R1. Neon tube NE is optically coupled to photocell PH1, that is, the photocell is exposed to the light emitted by the tube. Resistor R1 is shunted by an energy storage capacitor C2 for a purpose described hereinafter.

As is understood by those skilled in the art, neon glow tube NE is a voltage breakdown device which is triggered into conduction and begins to glow only when the voltage across the tube exceeds a first, relatively high voltage, e.g., 85 volts. The tube then continues to conduct at a second, relatively low voltage, e.g., 65 volts. In this region of conduction, tube NE has a negative resistance characteristic and when the current through the tube is limited, as by resistor R1, the tube NE tends to regulate the voltage across itself to a substantially constant level. If the voltage across the tube is reduced significantly below this regulated level or if the current through the tube falls below a predetermined extinction value, the bulb extinguishes and ceases to conduct and does not again conduct until the voltage is raised to the relatively high triggering point described previously. Other gaseous discharge devices having similar characteristics may be used in place of tube NE.

Connected across the neon tube NE is the collector-emitter output circuit of an NPN silicon transistor Q2 and a voltage divider 19 which includes a thermistor sensor TH1 in series with a reference resistor R2. Thermistor TH1 is of the PTC (positive temperature coefficient) type, that is, the resistance of the thermistor increases with increasing temperature. A junction 21 between thermistor TH1 and resistor R2 provides a control voltage which varies as a function of the resistance of thermistor TH1. Junction 21 is connected to the base terminal of transistor Q2 through a current-limiting resistor R3. Thermistor TH1 is thus connected across the base-emitter input circuit of transistor Q2. Resistor R3 is shunted by an energy storage capacitor C3 for a purpose described hereinafter. The base-emitter input circuit of transistor Q2 is shunted by a bleeder resistor R4 and also by a pair of silicon diodes D5 and D6 connected in series.

As is understood by those skilled in the art, the voltage applied to the base-emitter input circuit of silicon transistor Q2 must exceed a substantially predetermined threshold before conduction occurs in the emitter-collector output circuit. In the case of a transistor this threshold is commonly designated as the base-emitter offset voltage and is essentially that voltage which is necessary to forward bias the base-emitter diode junction and to drive current through the barrier layer, e.g., about 0.6 volt. The threshold is not completely abrupt but rather follows the conventional forward-biased diode characteristic. Once the input voltage threshold is exceeded, transistor Q2 functions substantially as a current amplifying means, the current in the collector-emitter circuit being related to the input current by the temperature-dependent current gain of the transistor.

The operation of the control apparatus illustrated is substantially as follows. When thermistor TH1 is relatively cool, its low resistance maintains the voltage at junction 21 below the input circuit threshold of transistor Q2 and thus the collector-emitter output circuit of transistor Q2 does not conduct. Current from the D.C. source flowing through the resistor R1 is thus free to trigger and energize the neon glow tube NE, the current through the tube being limited by resistor R1. When it conducts, tube NE emits light which falls on photocell PH1 and sharply reduces its resistance. Current flowing through the photocell triggers triac Q1 which thus energizes load LD.

It should be noted that, during this phase of the circuit's operation when tube NE is conducting, the voltage across transistor Q2 and across the voltage divider 19 is limited and effectively regulated by the conduction characteristics of the glow tube described previously. Thus, while transistor Q2 is turned off, it is protected from overvoltage damage even though the A.C. supply mains provide peak voltages greatly in excess of the maximum collector-emitter breakdown voltage of the transistor. Similarly, the substantially regulated voltage appearing across tube NE limits the current which can flow through R2 to the themistor TH1 thereby reducing any danger of substantial self-heating.

When thermistor TH1 senses a relatively warm temperature, its resistance increases and so does the voltage at the junction 21. When the voltage at junction 21 exceeds the input circuit voltage threshold of transistor Q2, the collector-emitter circuit of that transistor begins to conduct and to shunt current away from neon glow tube NE. It should be noted that, in forward biasing transistor Q2, the voltage across thermistor TH1 does not have to rise above a few volts and thus the sensing characteristics of the thermistor are not disturbed by self-heating or electric field effects. When conduction through the transistor pulls the voltage across the neon tube NE down below the regulating level so that the current through the tube falls below the extinction level, the tube abruptly ceases conduction and the current which was previously flowing through the tube then flows through the collector-emitter circuit of the transistor. Energy stored in capacitor C3 provides a reservoir of bias current for transistor Q2 so that the collector-emitter circuit can accept this abrupt inrush of current. Further, the connection of voltage divider 19 across the collector-emitter circuit of transistor Q2 provides negative feedback around this ampifying transistor tending to prevent this inrush of current from raising the collector-emitter voltage to a level which would sustain conduction in or permit re-ignition of the tube NE.

When tube NE ceases to glow, the flow of triggering current through photocell PH1 is abruptly cut off, triac Q1 is turned off and thus the load LD is deenergized.

If thermistor TH1 cools down, the voltage at junction 21 falls so that the bias applied to transistor Q2 is reduced. The collector-emitter voltage of transistor Q2 then rises, thereby permitting the neon tube NE to re-ignite. The energy stored in capacitor C2 provides a surge of current to insure that the reignition of tube NE occurs abruptly and completely. The light generated by conduction in tube NE triggers triac Q1 through photocell PH1 and thus full-wave power is again applied to load LD. Since the triggering voltage of tube NE is substantially higher than its regulating or extinction voltage, there is a corresponding differential between the value of thermistor resistance at which load LD is energized and that at which the load is deenergized. Thus, in the case of a thermistor having a positive temperature coefficient of resistance, load LD is deenergized when thermistor TH1 senses a relatively warm temperature and is reenergized only when the sensed temperature falls to a lower, relatively cool temperature.

Resistor R4 and diodes D5 and D6 stabilize the operating points of the control circuit for changes in ambient temperature which might otherwise cause the trip points to shift due to temperature-induced variations in the input voltage threshold and current gain of transistor Q2. As the ambient temperature increases, the current gain of transistor Q2 tends to increase but at the same time the bias current applied to the base of transistor Q2 is reduced in a compensating manner by increased conduction through diodes D5 and D6. For example, in a control in which the values of resistor R2 and thermistor TH1 were selected to trip the control and deenergize the load when the thermistor's resistance reaches a nominal level of 5,000 ohms, variations in ambient temperature from 25° C. to 100° C. caused a shift in the trip point of only about 200 ohms.

Since the voltage across transistor Q2 and voltage divider 19 prior to tripping is effectively regulated by the conduction characteristics of neon tube NE, the load deenergizing trip point is also relatively insensitive to moderate variations in line voltage. Further, the control can be operated on different line voltages (e.g., 230 volts A.C. rather than 115 volts A.C.) merely by selecting the value of resistor R1 to produce a suitable nominal current through neon tube NE. The characteristics of the neon tube then regulate the voltage across the transistor and the voltage divider, permitting the trip and reset levels to remain susbtantially unchanged despite the change in supply voltage. The components ahead of the tube NE, e.g., diodes D1–D4 and triac Q1, must have breakdown voltages sufficient to withstand the peak supply voltage encountered. Since no voltage-dropping transformer is employed, the control apparatus illustrated may be operated on A.C. of different frequencies, e.g., 400 c.p.s. in place of 60 c.p.s., substantially without change.

Since the control apparatus illustrated is capable of deenergizing load LD when the temperature of thermistor TH1 reaches a first predetermined level and reenergizing the load when the temperature of the thermistor falls below a second, lower predetermined level, there being an advantageous differential between the two levels, it can be seen that this control is suitable for providing on-off temperature control, the load LD being constituted by an electric heater with the thermistor TH1 being located in the zone affected by the heater. This control apparatus is also useful for providing thermal protection for electric motors. In this case the thermistor TH1 can be imbedded within the windings of a motor to be protected and the load LD can be constituted by the operating coil of a power contactor connected for deenergizing the motor when the thermistor TH1 senses a dangerously high temperature. As noted previously, the deenergizing trip point is highly insensitive to variations in ambient temperature or to line voltage variations and thus the protective trip temperature may be quite precisely preselected.

In the uses of this circuit described above an NTC thermistor may be used if the positions of the thermistor and the resistor R2 are reversed in the voltage divider 19. The thermistor will, however, in this case be subjected to relatively higher voltages.

While in the circuit illustrated the voltage breakdown device has been shown as a neon glow tube, it should be understood that other types of gaseous or solid-state voltage breakdown devices having the desired characteristics may also be used and that other means for responding to the breakdown or triggering of such a device other than the photocell illustrated may also be used. Similarly, amplifying means other than the single transistor shown may be used for selectively shunting current away from the breakdown device. Further, other current control devices, such as single SCR's, may be used in place of the triac Q1.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. Apparatus for controlling the energization of an electrical load in response to variations in the resistance of a sensor, said apparatus comprising:

a voltage breakdown device which is triggered into conduction substantially at a first voltage and which then continues to conduct at a substantially lower voltage;

circuit means including a current limiting resistance in series with said breakdown device for connecting said device across a voltage source;

means responsive to triggering of said breakdown device for controlling the energization of said load;

amplifying means having an output circuit connected across said breakdown device and an input circuit having a voltage threshold which must be exceeded before substantial conduction occurs in said output circuit;

a voltage divider interconnected with said source and including a variable resistance sensor and a reference resistance connected in series with said sensor, said divider having a junction between said sensor and said reference resistance providing a control voltage which varies substantially as a function of the resistance of said sensor; and means for coupling said control voltage to the input circuit of said amplifying means whereby sensor resistances outside of a predetermined range cause the output circuit of said amplifying means to shunt said breakdown device thereby preventing triggering thereof and thereby controlling the energization of said load.

2. Apparatus as set forth in claim 1 in which said voltage breakdown device has a negative resistance region between said first voltage and said lower voltage.

3. Apparatus as set forth in claim 1 in which said voltage breakdown device comprises a neon glow tube.

4. Apparatus as set forth in claim 3 in which said source provides D.C. to said circuit means.

5. Apparatus as set forth in claim 3 in which said means responsive to triggering of said breakdown device includes a photocell optically coupled to said neon glow tube.

6. Apparatus as set forth in claim 1 in which said means responsive to triggering of said breakdown device comprises a semiconductor current switching device.

7. Apparatus as set forth in claim 6 in which said semiconductor current switching device is a triac.

8. Apparatus as set forth in claim 1 in which said amplifying means comprises a transistor.

9. Apparatus as set forth in claim 1 in which said amplifying device includes a silicon transistor having a base-emitter offset voltage of about 0.6 volt providing said voltage threshold.

10. Apparatus as set forth in claim 9 in which said sensor is a thermistor.

11. Apparatus as set forth in claim 10 in which said thermistor is connected across the base-emitter circuit of said silicon transistor.

12. Apparatus as set forth in claim 11 including at least one temperature compensating diode connected across the base-emitter circuit of said transistor.

13. Apparatus as set forth in claim 12 in which said collector-emitter circuit of said silicon transistor is connected across said breakdown device for limiting the voltage applied to said transistor.

14. Apparatus as set forth in claim 1 in which said voltage divider is connected across said breakdown device for limiting the current applied to said sensor.

15. Apparatus as set forth in claim 1 in which said voltage divider is connected across the output circuit of said amplifying means for providing negative feedback around said amplifying means.

16. Apparatus for controlling the energization of an electrical load in response to variations in the resistance of a sensor, said apparatus comprising:

a voltage breakdown device which is triggered into conduction substantially at a first voltage and which then continues to conduct at a substantially lower voltage, said device having a negative resistance region between said two voltages;

circuit means including a current limiting resistance in series with said breakdown device for connecting said device across a D.C. voltage source;

means responsive to triggering of said breakdown device for controlling the energization of said load;

a transistor amplifying means having an output circuit connected across said breakdown device and an input circuit having a voltage threshold which must be exceeded before substantial conduction occurs in said output circuit;

a voltage divider connected across the output circuit of said amplifying means and including a variable resistance sensor and a reference resistance connected in series with said sensor, said divider having a junction between said sensor and said reference resistance providing a control voltage which varies substantially as a function of the resistance of said sensor; and means for coupling said control voltage to the input circuit of said amplifying means whereby sensor resistances outside of a predetermined range cause the output circuit of said amplifying means to shunt said breakdown device thereby preventing triggering thereof and thereby controlling the energization of said load.

17. Apparatus for controlling the energization of an electrical load in response to variations in the resistance of a sensor, said apparatus comprising:

a light-emitting, gaseous discharge device which is triggered into conduction substantially at a first voltage and which then continues to conduct at a substantially lower voltage;

circuit means including a current limiting resistance in series with said device for connecting said device across a D.C. voltage source;

controllable semiconductor current switching means for switching the flow of current to said load;

a photocell responsive to light emitted from said gaseous discharge device for controlling said switching means;

a transistor having a collector-emitter output circuit connected across said discharge device and a base-emitter input circuit having a voltage threshold which must be exceeded before substantial conduction occurs in said output circuit;

a voltage divider connected across said discharge device and including a variable resistance sensor and a reference resistance connected in series with said sensor, said divider having a junction between said sensor and said reference resistance providing a control voltage which varies substantially as a function of the resistance of said sensor; and means for connecting said sensor across the base-emitter input circuit of said transistor for coupling said control voltage to said input circuit whereby sensor resistances above a predetermined level cause the output circuit of said transistor to shunt said discharge device thereby preventing triggering thereof and thereby controlling the energization of said load.

18. Apparatus for controlling the energization of a heat producing electrical load in response to changes in its temperature, said apparatus comprising:

a neon glow tube;

circuit means including a current limiting resistance in series with said tube for connecting said tube across a D.C. source;

a silicon transistor having a collector-emitter output circuit connected across said tube and a base-emitter input circuit having an offset voltage which must be exceeded before substantial conduction occurs in said output circuit;

a voltage divider connected across said tube, said divider including a PTC thermistor responsive to the temperature of said load and a reference resistor in series with said thermistor;

means for connecting said thermistor across the input circuit of said transistor whereby temperatures above a predetermined level cause the output circuit of said transistor to conduct and to shunt current away from said tube;

controllable semiconductor current switching means for switching the flow of current to said load; and a photocell responsive to light emitted from said tube for controlling said switching means to apply current to said load only when said tube emits light, whereby said load is deenergized when the temperature of said load exceeds said predetermined level.

References Cited

UNITED STATES PATENTS

| | | | |
|---|---|---|---|
| 3,042,782 | 7/1962 | Bray | 219—500 |
| 3,348,131 | 8/1964 | Banks. | |

BERNARD A. GILHEANY, *Primary Examiner.*

FRED E. BELL, *Assistant Examiner.*